United States Patent
Quinn

(10) Patent No.: US 8,334,688 B2
(45) Date of Patent: Dec. 18, 2012

(54) MULTI-POSITION SWITCH HAVING DUAL OUTPUT HALL DEVICE

(75) Inventor: Ian Winston Quinn, Waltham, MA (US)

(73) Assignee: CoActive Technologies, LLC, Newton, MA (US)

(*) Notice: Subject to any disclaimer, the term of this patent is extended or adjusted under 35 U.S.C. 154(b) by 533 days.

(21) Appl. No.: 12/466,136

(22) Filed: May 14, 2009

(65) Prior Publication Data

US 2010/0289484 A1    Nov. 18, 2010

(51) Int. Cl.
 *G01B 7/14* (2006.01)
 *G01B 7/30* (2006.01)
(52) U.S. Cl. .................................................. 324/207.2
(58) Field of Classification Search ............................ None
See application file for complete search history.

(56) References Cited

U.S. PATENT DOCUMENTS

| 4,778,353 A * | 10/1988 | Wiernicki ...................... 417/53 |
| 4,812,674 A * | 3/1989 | Sue et al. ...................... 307/116 |
| 5,477,143 A * | 12/1995 | Wu ........................... 324/207.21 |
| 6,140,813 A * | 10/2000 | Sakanoue et al. .............. 324/174 |
| 6,992,478 B2 * | 1/2006 | Etherington et al. ...... 324/207.2 |
| 7,068,132 B2 * | 6/2006 | Asa ............................... 335/205 |
| 7,088,096 B2 * | 8/2006 | Etherington et al. .... 324/207.24 |

OTHER PUBLICATIONS

"Dual, Chopper-Stabilized, Ultra-sensitive, Bipolar Hall-Effect Switch" by Allegro MicroSystems, Inc. Aug. 21, 2000.*
"MLX90224 Dual Hall Effect Switch" by Melexis Microelectronic Integrated Systems, Jul. 2003.*

* cited by examiner

*Primary Examiner* — Paresh Patel
(74) *Attorney, Agent, or Firm* — Fox Rothschild LLP

(57) ABSTRACT

A multi-output switch includes a dipole magnet configured to move from a central position to either a first position or a second position and a Hall Effect sensor having a first sensitive area with a first output and a second sensitive area with a second output, wherein the sensor is relatively positioned such that when the magnet is in the central position, the first output and second output read off, when the magnet is in the first position the first sensitive area is activated and the first output reads on, and when the magnet is in the second position the second sensitive area is activated and the second output reads on. The switch may further include a magnet holder configured to house the magnet and define a pathway of movement for the magnet.

17 Claims, 6 Drawing Sheets

MULTI-POSITION SWITCH HAVING DUAL OUTPUT HALL DEVICE

BACKGROUND

This document relates to a switch having a Hall Effect device, and more particularly to a multi-position switch having a single Hall Effect device with dual digital outputs.

Switches designed to be used in harsh environments are becoming smaller while reliability requirements are simultaneously increasing. For example, switches used in automotive applications, such as gear shifts, would ideally be designed to fit into an isolated area while still maintaining a high reliability as replacing the switch may require significant effort and resources. If the gear shift switch is located in the steering console of an automobile, the entire steering column may need to be removed or replaced to repair the defective switch. Therefore, it is desirable to manufacture reliable compact switches for certain applications.

One possible solution is to manufacture a mechanical switch having various moving parts used to switch between various states. A mechanical switch has several drawbacks. One major drawback is the limited life cycle of the moving parts. Another drawback is that mechanical switches are not as robust against extreme environmental conditions. Mechanical switches require a sealed casing to protect against environmental conditions such as dirt and precipitation. Similarly, the moving pieces may be constructed of various metals (e.g., aluminum, steel) that may react differently in different temperatures. This may result in reduced reliability of the switch as in various temperatures due to changes in materials (e.g., shrinkage or expansion) that may cause reduced contact force in the switch. As discussed above, replacing some switches is tedious and time-consuming, making mechanical switches, with the various drawbacks discussed herein, a less than ideal solution.

Another solution for increasing reliability in switches is using a solid state compact switch utilizing few, if any, moving parts. One example of a solid state switch is a switch utilizing Hall Effect sensors. Hall Effect sensors are specialized integrated circuits which respond to the presence of a magnetic field. By including Hall Effect sensors along with a magnet positioned to move along the Hall Effect sensors, a switch may be constructed that includes a single moving part.

An example of a switch using a Hall Effect sensor is shown in FIG. 1. Specifically, FIG. 1 illustrates switch 100. Switch 100 uses a side approach for the magnet orientation and movement. Switch 100 includes two Hall Effect sensors 102a and 102b. Each Hall Effect sensor includes plates 104a and 104b that are sensitive to a certain magnetic pole. In this example, both sensitive plate 104a of sensor 102a and sensitive plate 104b are sensitive to the south pole of magnet 106. Magnet 106 is configured to move in the direct of the arrow next to sensors 102a and 102b. As the magnet moves toward sensor 102a, plate 104a detects the south pole of magnet 106 and sensor 102a turns on. Similarly, as magnet 106 moves toward sensor 102b, plate 104b detects the south pole of magnet 106 and sensor 102b turns on. The components of switch 100 are configured and arranged such that there are three possible scenarios: (1) when magnet 106 is moved toward sensor 102a, only sensor 102a turns on, (2) when magnet 106 is moved toward sensor 102b, only sensor 102b turns on, and (3) when magnet 106 is in the central or neutral position, both sensors 102a and 102b are off.

Switches using solid state devices like Hall Effect sensors are more reliable than mechanical switches as the number of moving parts is greatly reduced. Switches using these typical arrangements of Hall Effect sensors, however, still have several drawbacks. One major drawback is that only a single output is available per Hall Effect sensor requiring two Hall Effect sensors be used. Another drawback of these typical arrangements using Hall Effect sensors is switch point tolerance. The switch point tolerance is influenced by a number of factors, including temperature, positional tolerance of the magnet with respect to the Hall Effect sensor in the direction of travel of the magnet, manufacturing variations in the magnet and variation in the Hall Effect sensor operate/release threshold. The strength of the magnet must be carefully matched with the sensitivity of the Hall Effect sensor. If the sensitivity of the Hall Effect sensor is too high with respect to the magnet strength, then positional tolerances may be poor. A higher sensitivity Hall Effect sensor also raises the risk of interference from outside magnetic fields. Conversely, if the sensitivity of the Hall Effect sensor is too low with respect to the magnet strength, the positional tolerance is improved but there is a higher risk that the magnet will not trigger the Hall Effect device.

Due to potentially large positional tolerances, the size of the movements of the magnet from one position to another must be big enough to ensure that there is no overlap in magnetic field detection at the Hall Effect sensor between positions. This large neutral distance between positions is not always desired due to size constraints in certain applications.

Another drawback is the size required to house multiple Hall Effect sensors along with the magnet as well as the addition of another component and the increased likelihood that the component may fail.

Several attempts have been made to overcome the drawbacks of switches using multiple Hall Effect sensors. One example is to use a multi-pole magnet to improve positional tolerance. In the example of switch 100 of FIG. 1, magnet 106 would be replaced with a multi-pole magnet having a north-south-north pole configuration. The multi-pole magnet would create a sharper change in the magnetic field around the switching positions of the magnet's movement, improving the positional tolerance. However, the multi-pole magnet would need to be larger than the standard dipole magnet, making the switch more difficult to package. Also, the multi-pole magnet is more difficult to manufacture than a dipole magnet, resulting in a cost increase.

Another example of a switch providing multiple outputs with a single Hall Effect sensor and magnet utilizes a programmable linear Hall Effect sensor. A programmable linear sensor can be programmed to produce different outputs based on the detected strength of a magnetic field, i.e., as the magnet gets closer, the field increases and changes the output of the sensor. This approach introduces a new set of drawbacks, primarily the need to program the sensors, comparator circuits must be used to interpret the output of the sensor and determine the position of the magnet, and the programmable sensors are significantly more expensive than standard Hall Effect sensors.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "sensor" is a reference to one or more sensors and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In one general respect, the embodiments disclose a switch. The switch includes a dipole magnet configured to move from a central position to either a first position or a second position and a Hall Effect sensor having a first sensitive area with a first output and a second sensitive area with a second output, wherein the sensor is relatively positioned such that when the magnet is in the central position, the first output and second output read off, when the magnet is in the first position the first sensitive area is activated and the first output reads on, and when the magnet is in the second position the second sensitive area is activated and the second output reads on.

In another general respect, the embodiments disclose a second switch. The second switch includes a magnet having a north pole and a south pole and a dual output Hall Effect sensor having a north pole magnetic field sensitive area with a first output and a south pole magnetic field sensitive area with a second output, wherein the sensor is relatively positioned such that when the magnet is in the central position, the first output and the second output both read off, when the magnet is in the first position the north pole magnetic field sensitive area is activated and the first output reads on, and when the magnet is in the second position the south pole magnetic field sensitive area is activated and the second output reads on.

In another general respect, the embodiments disclose a third switch. The third switch includes a magnet having a north pole and a south pole and producing a magnetic field and a dual output Hall Effect sensor having a north pole magnetic field sensitive area with a first digital output and a south pole magnetic field sensitive area with a second digital output, wherein the sensor is relatively positioned such that when the magnet is in the central position, both the north pole magnetic field sensitive area and the south pole magnetic field sensitive area measure zero net magnetic field and both the first digital output and the second digital output read off, when the magnet is in the first position the north pole magnetic field sensitive area measures a net magnetic field and is activated resulting in the first digital output reading on, and when the magnet is in the second position the south pole magnetic field sensitive area measures a net magnetic field and is activated resulting in the second digital output reading on.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
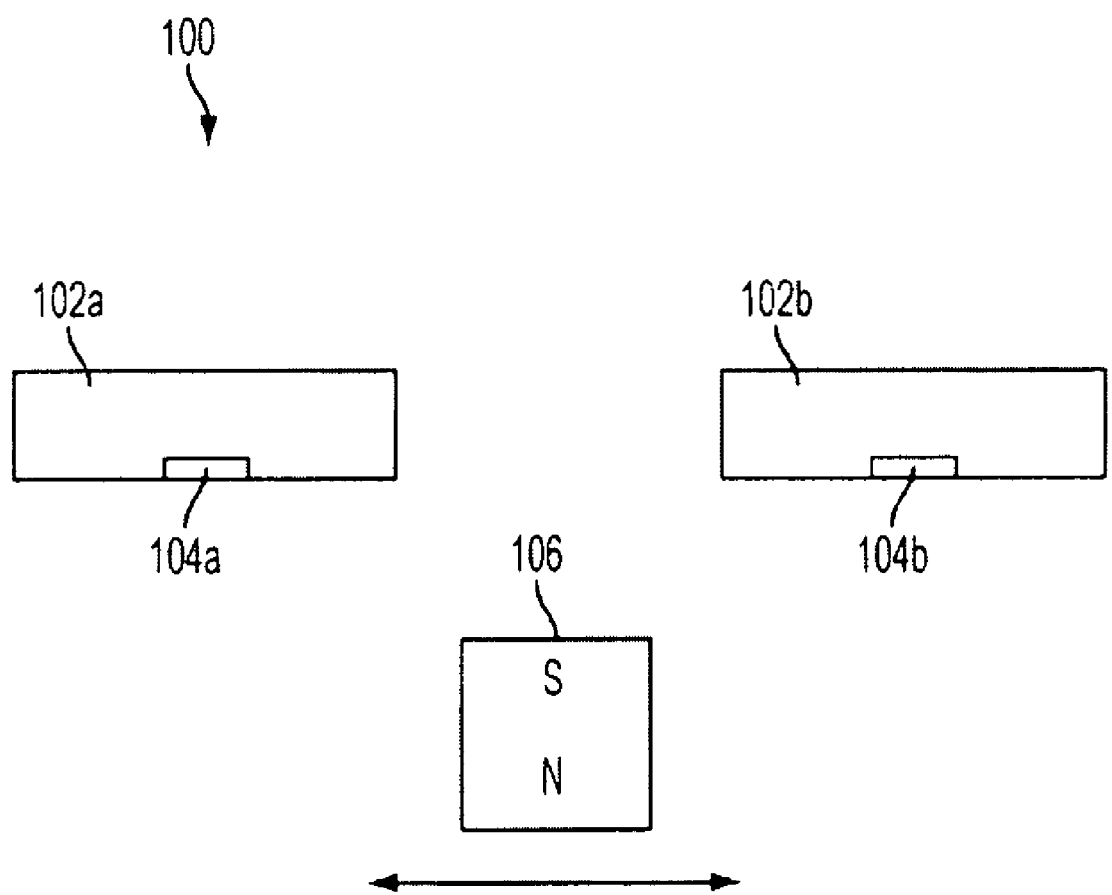
FIG. 1 illustrates various prior art embodiments of switches using Hall Effect sensors.
Figure 2:
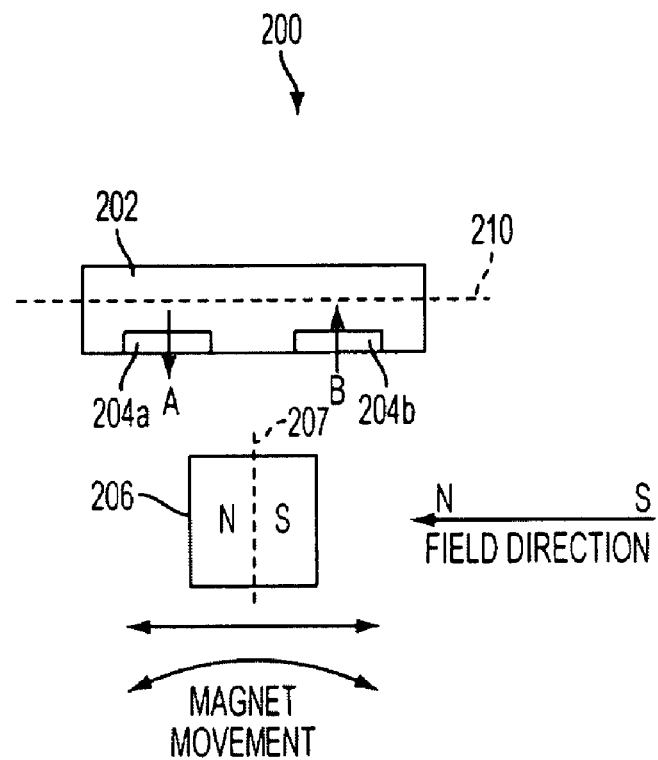
FIG. 2 illustrates various embodiments of a switch using a dual output Hall Effect sensor.

FIG. 2 illustrates a compact switch 200 using a Hall Effect sensor and having multiple possible outputs. In this example, switch 200 may be configured to produce 3 outputs: (1) Off, (2) $On_1$ and (3) $On_2$. These outputs will be explained in greater detail in the discussion of FIGS. 4*a-c* below.

Unlike switch 100 as discussed above, switch 200 may have a dual output Hall Effect sensor 202. Dual output Hall Effect sensor 202 may be a Hall Effect sensor having two areas or plates that are sensitive to opposite magnetic poles. Hall Effect sensor 202 may produce two corresponding digital outputs, the previously mentioned $On_1$ and $On_2$ depending on which of the sensitive areas detects a change in magnetic field. In switch 200, sensor 202 may have two sensitive areas or plates 204*a* and 204*b* that are sensitive to opposite magnetic poles. As configured, plate 204*a* may be sensitive to a magnetic south pole and plate 204*b* may be sensitive to a magnetic north pole. Arrows A and B represent the direction of sensitivity to a magnetic field for each of plates 204*a* and 204*b* respectively.

Unlike the position of magnet 106 of switch 100, magnet 206 may be oriented parallel to a longitudinal axis 210 of sensor 202. More specifically, the north-south pole orientation of magnet 206 may be normal or perpendicular to the sensitivity directions of plates 204*a* and 204*b*. At the center plane 207 of the magnet 206, the normal magnetic field produced by the magnet's north and south poles is zero. The field increases with distance from the center plane 207 toward one of the poles of the magnet 206. The normal magnetic field of magnet 206 increases in polarity corresponding with the magnet pole being approached (i.e., north or south). One advantage of this approach is that a reversal point of the magnetic field may be based solely on magnet geometry and is not impacted by variations in magnet strength. Until the center plane 207 of the magnet 206 passes over plates 204*a* and 204*b*, there is no risk of accidental actuation as the field normal to the sensor is in the opposite polarity, thereby turning the sensor 202 off.

The magnet 206 may be manufactured from various magnetic materials. One possible material may be Neodymium Iron Boron (NeFeB). NeFeB magnets are inexpensive to produce and even small NeFeB magnets may generate a strong magnetic field. One advantage of using a high magnetic energy material such as NeFeB is that a relatively short, powerful magnet may be created. The shorter and more powerful the magnet, the more rapidly the field normal to the sensor changes from the center plane of the magnet, e.g., center plane 207. This rapid change in field strength may result in superior positional tolerances. As discussed above with respect to typical Hall Effect sensor switches, positional tolerances with respect to the sensors and magnets are an important consideration in switch design.

It should be noted that FIG. 2 shows both a linear path of movement as well as a rotational path of movement for magnet 206. Depending on the application, a slide switch layout may be used which would result in the magnet 206 moving in the linear path. Alternatively, a rocker or toggle switch layout may be used, resulting in the magnet 206 moving in the rotational path. An exemplary embodiment illustrating a rocker switch layout is addressed below in the discussion of FIG. 7.

Figure 3:
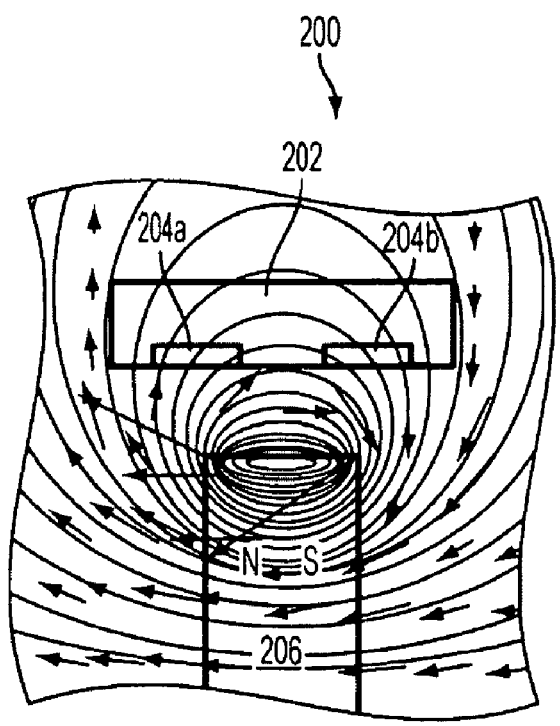
FIG. 3 illustrates various embodiments of a switch using a dual Output Hall Effect sensor including a magnetic field diagram.
Figure 4A:
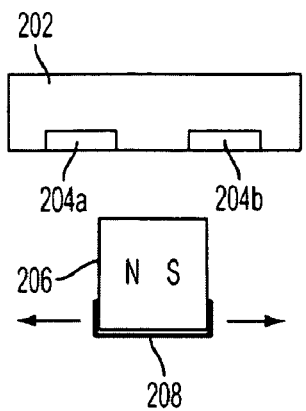
FIGS. 4*a-c* illustrate various embodiments of a switch using a dual output Hall Effect sensor in various positions.
Figure 4B:
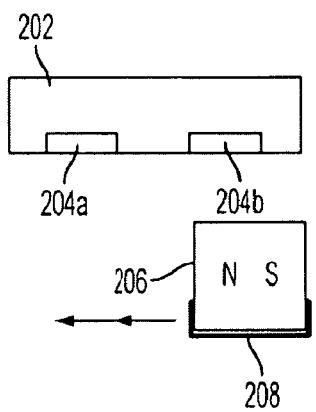
Figure 4C:
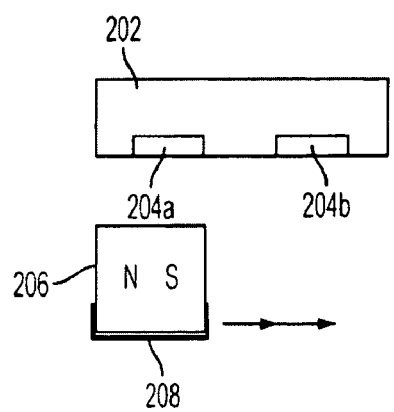

FIG. 3 illustrates switch 200 with an exemplary magnetic field produced by magnet 206. The magnetic field is represented by the various arrows surrounding sensor 202 and magnet 206. Here, magnet 206 may be at a central or neutral position such that the net magnetic field detected at plate 204a may be identical to the net magnetic field detected at plate 204b. At this position, no net magnetic field may be detected at either plate, and the output of sensor 202 may be neutral and switch 200 may output off. As magnet 206 moves, the net magnetic field at the plates may change, thereby changing the output of sensor 202 and switch 200 itself. FIGS. 4a-c illustrate various embodiments of switch 200 with magnet 206 in various positions.

FIGS. 4a-c illustrate switch 200 with magnet 206 in various positions. To move magnet 206, magnet holder 208 may be used. Holder 208 may be configured to move magnet 206 from the central to either a first or second position. Holder 208 may be further configured to move magnet 206 parallel to sensor 202 while ensuring magnet 206 and sensor 202 do not make contact.

FIG. 4a shows magnet 206 in the central position. When in the central position, the north pole of magnet 206 is closest to the south sensitive area 204a of sensor 202, the south pole of the magnet is closest to the north sensitive area 204b of the sensor, and the center of the magnet is substantially positioned at the center of the space between the two sensitive areas. Thus, the net magnetic field at plates 204a and 204b is oriented opposite to the sensitivity of the plates, driving the output of sensor 202 to zero and turning (or maintaining) switch 200 off. FIG. 4b shows magnet 206 moved to a first position. The first position may be a position where the center plane 207 of magnet 206 is sufficiently past plate 204b, thereby moving the north pole of the magnet closer to the north sensitive area or plate 204b, and producing a normal magnetic field in a proper sensitivity direction at plate 204b. This normal magnetic field may activate plate 204b, turning on digital output 1 of sensor 202 and changing the state of switch 200 to $On_1$. FIG. 4c shows magnet 206 moved to a second position. The second position may be a position where the center plane 207 of magnet 206 is sufficiently past plate 204a, thereby moving the south pole of the magnet closer to the south sensitive area or plate 204a, and producing a normal magnetic field in a proper sensitivity direction at plate 204a. This normal magnetic field may activate plate 204a, turning on digital output 2 of sensor 202 and changing the state of switch 200 to $On_2$. It should be noted that the output of switch 200 may be reversed and $On_1$ may occur when magnet 206 is in the second position and $On_2$ may occur when magnet 206 is in the first position. Similarly, $On_1$ and $On_2$ are merely used by way of example and the outputs of switch 200 may be labeled accordingly depending on the application.

It should be noted that the linear movement of magnet 206 in FIGS. 4a-c is shown by way of example only. As discussed above, magnet 206 may move in a rotational direction provided the range of rotational movement results in center line 207 of the magnet crosses from between plates 204a and 204b to a position past one of the plates, thereby activating sensor 202.

Figure 5A:
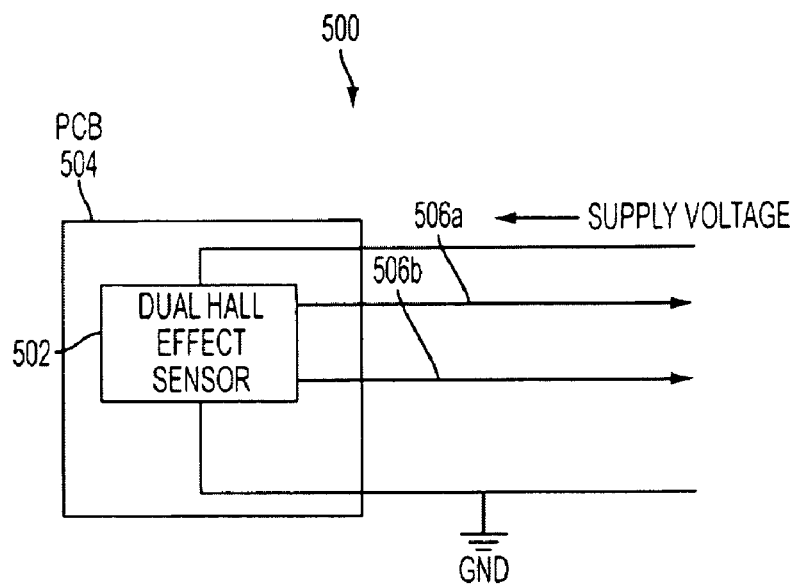
FIG. 5*a-b* illustrate exemplary circuits including a dual output Hall Effect sensor.

FIG. 5a shows an exemplary circuit 500 including a dual output Hall Effect sensor 502. Sensor 502 may be mounted on printed circuit board (PCB) 504. It should be noted that circuit 500 is shown by way of example only, and a dual output Hall Effect sensor may be integrated into various devices and/or circuits depending on the application.

A supply voltage may be provided to sensor 502 via a connection to PCB 504. Similarly, the two outputs of sensor 502 (e.g., the digital outputs from the two magnetically sensitive plates discussed above) may be obtained by another device (not shown) by connecting to leads coming off PCB 504. A first output 506a of the sensor 502 may deliver a signal (e.g., $On_1$) when one of the sensitive areas (e.g., the north sensitive area) of the sensor returns a voltage triggered by its detection of a magnetic field. A second output 506b of the sensor 502 may deliver a signal (e.g., $On_2$) when the other sensitive area (e.g., the south sensitive area) of the sensor returns a voltage triggered by its detection of a magnetic field. When neither output 506a or 506b delivers a signal, the switch may be in the Off position. The device can monitor the outputs of the leads, and any changes in signals on the leads may indicate the overall output of the switch, i.e., Off, $On_1$ or $On_2$.

Figure 5B:
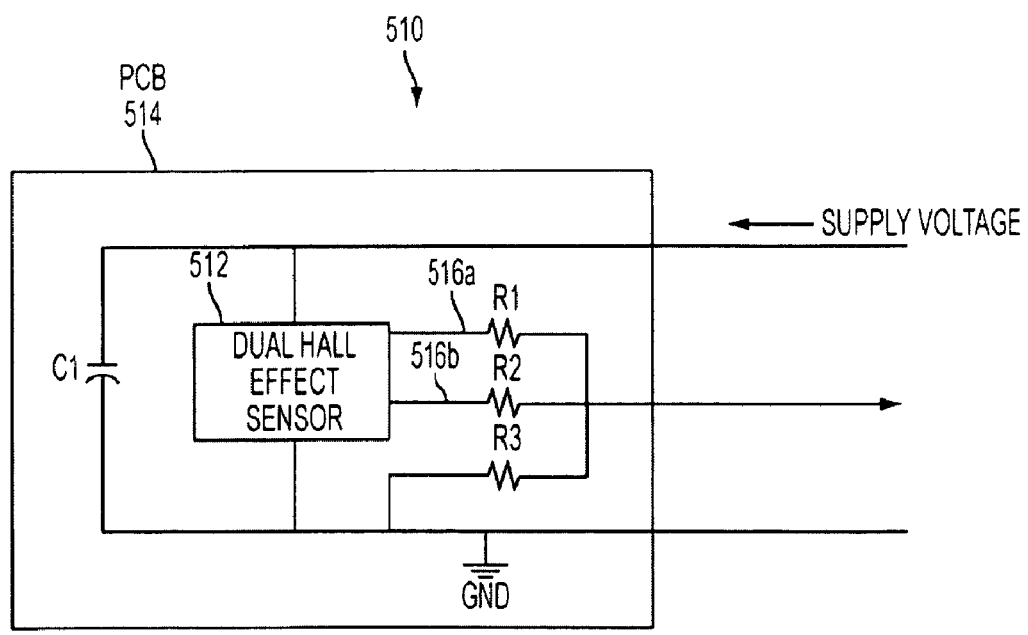

Depending on the application of PCB 504 and the resulting available supply voltage and current, additional components may be included in circuit 500. For example, as shown in FIG. 5b, in circuit 510 a dual output Hall Effect sensor 512 may be mounted on a PCB 514. A resistor network, e.g., resistors R1, R2 and R3, may be included on PCB 514 or at another location in circuit 500 so that a first sensor output 516a leads to R1 and a second sensor output 516b leads to R2. The resulting outputs of sensor 512 may thus reduce the number of electrical connections between PCB 514 and another device. Similarly, a capacitor C1 may be included in parallel with sensor 512 to suppress any noise on the input voltage line. It should be noted that circuit 510 is shown by way of example only, and additional configurations of components may be used depending on the application of the circuit.

Figure 6:
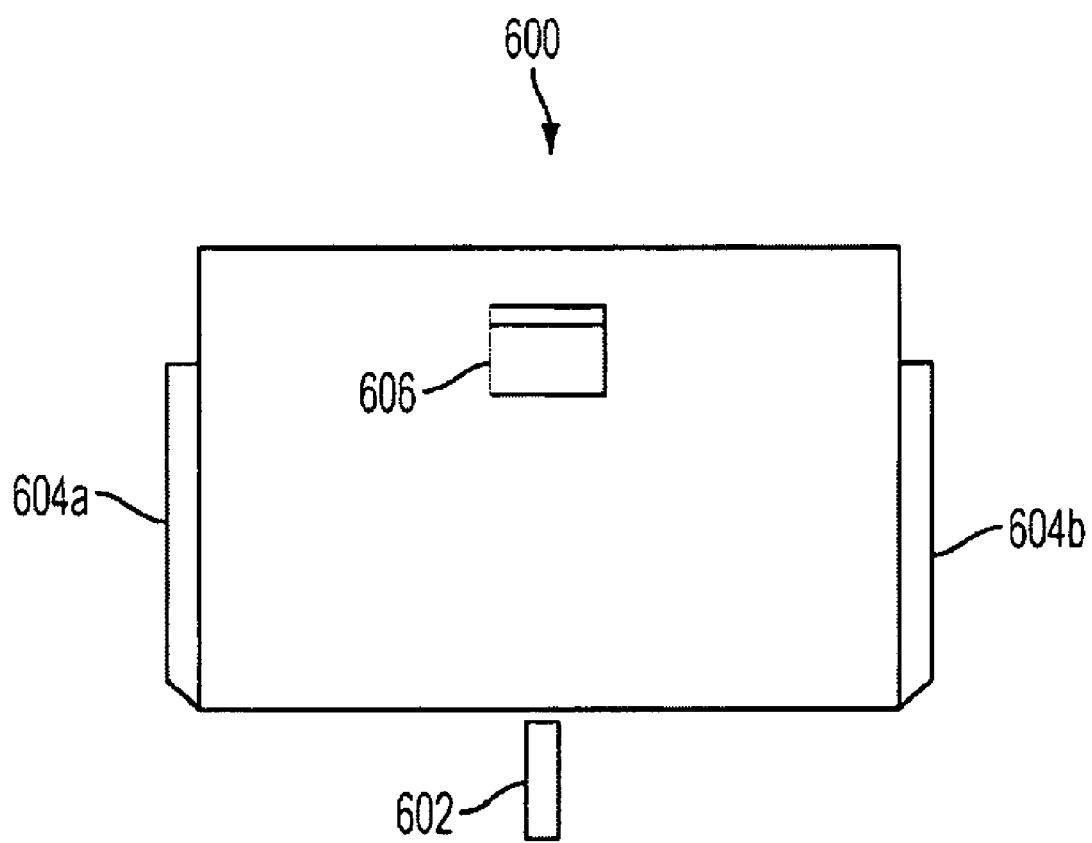
FIG. 6 illustrates an exemplary enclosure for housing a switch having a dual output Hall Effect sensor.

FIG. 6 shows an exemplary enclosure 600 that may house a switch using a dual output Hall Effect sensor such as the switches described above in FIGS. 2, 3 and 4a-c. Enclosure 600 may enclose a dual output Hall Effect sensor. A magnet 602 may be directly or indirectly mounted to the enclosure 600. Similarly, magnet 602 may be configured to be mounted in a magnet holder. Magnet 602 may be configured to either slide or rotate. For example, magnet 602 may be configured to toggle left and right about a central pivot point, resulting in a rotation of the magnet. Conversely, magnet 602 may be configured to slide a short distance left of center and right of center, resulting in a sliding movement of the magnet. Enclosure 600 may also include various tabs 604a and 604b, as well as various notches or indentations 606. Depending on the application and positioning of enclosure 600, these tabs and notches may be used to anchor the enclosure firmly to another component.

Enclosure 600 may be designed such that various components of the switch, such as the sensor and PCB described in the discussion of FIGS. 5a-b above, fit securely inside the enclosure.

Figure 7:
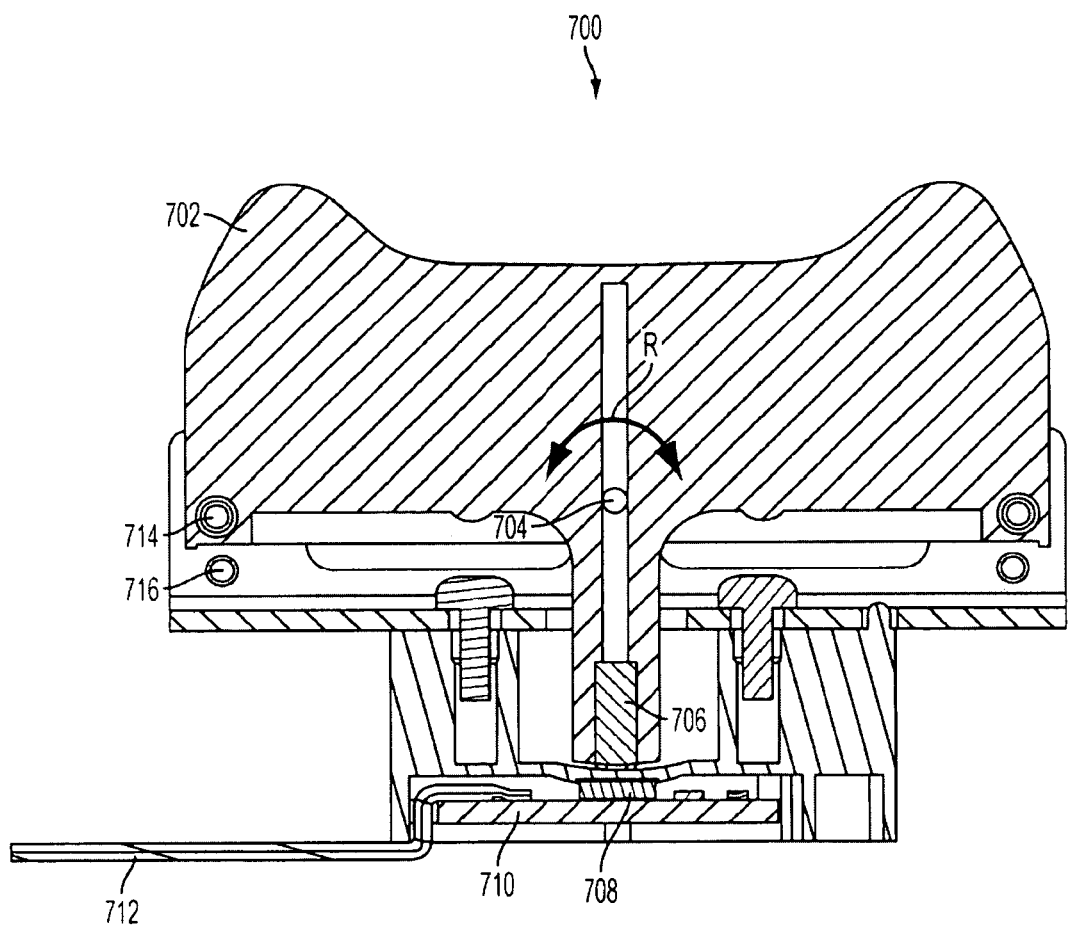
FIG. 7 illustrates an exemplary rocker switch assembly.

FIG. 7 shows an exemplary rocker, or toggle, switch assembly 700. Switch assembly 700 may include a magnet holder 702, shown in this example in a center position. Magnet holder 702 may be configured to rotate about rotational point 704 as indicated by arrow R. Movement of magnet holder 702 about rotational point 704 may cause the displacement of magnet 706, causing one of the sensitive plates of dual output Hall Effect sensor 708 to detect a magnetic field. Sensor 708 may be mounted on PCB 710, and the outputs of sensor 708 (e.g., Off, $On_1$ and $On_2$) may be electrically connected to another device by wires 712. Any movement of magnet holder 702, e.g., from the center position to a first or second position, may be limited or regulated by a damping device or a device configured to limit the movement of the magnet holder. For example, magnet holder 702 may include detent ball 714. As magnet holder 702 rotates, detent ball 714 may enter detent 716, resulting in magnet holder 702 being unable to rotate any further in that particular direction. Additional damping devices such as various springs may be used to limit the movement of magnet holder 702.

It should be noted that the above-disclosed switch and enclosures may be incorporated into various embodiments. For example, the magnet may be mounted to an actuator that is used to move the magnet between the various positions. A connection between the actuator and the body or enclosure of the switch may be, for example, sliding or rotating to make a slide or toggle/rocker switch. The switches disclosed herein may be integrated into automotive controls (e.g., upshift/downshift switch), off-road vehicle controls or industrial machinery controls.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A switch comprising:
   a dipole magnet configured to move from a central position to either a first position or a second position; and
   a Hall Effect sensor having a first sensitive area with a first output and a second sensitive area with a second output, wherein the sensor is relatively positioned such that when the magnet is in the central position, the first output and second output are off, when the magnet is in the first position the first sensitive area is activated and the first output is on, and when the magnet is in the second position the second sensitive area is activated and the second output is on.

2. The switch of claim 1, wherein the first sensitive area is sensitive to a north pole of the magnet and the second sensitive area is sensitive to a south pole of the magnet.

3. The switch of claim 2, wherein no net magnetic field is detected by either the first or the second sensitive areas when the magnet is in the central position.

4. The switch of claim 2, wherein a net magnetic field is detected by the first sensitive area when the magnet is in the first position.

5. The switch of claim 2, wherein a net magnetic field is detected by the second sensitive area when the magnet is in the second position.

6. The switch of claim 1, further comprising a magnet holder configured to house the magnet and define a pathway of movement for the magnet from the central position to either the first position or the second position.

7. The switch of claim 6, wherein the pathway of movement for the magnet is a rotational pathway.

8. The switch of claim 1, wherein the central position of the magnet is an off position for the switch.

9. The switch of claim 1, wherein the first output and the second output are both digital outputs.

10. A switch, comprising:
    a magnet having a north pole and a south pole; and
    a dual output Hall Effect sensor having a north pole magnetic field sensitive area with a first output and a south pole magnetic field sensitive area with a second output, wherein the sensor is relatively positioned such that when the magnet is in the central position, the first output and the second output both are off, when the magnet is in the first position the north pole magnetic field sensitive area is activated and the first output is on, and when the magnet is in the second position the south pole magnetic field sensitive area is activated and the second output is on.

11. The switch of claim 10, further comprising a magnet holder configured to house the magnet and define a pathway of movement for the magnet from the central position to either the first position or the second position.

12. The switch of claim 11, wherein the pathway of movement for the magnet is a rotational pathway.

13. The switch of claim 10, wherein the central position of the magnet is an off position for the switch.

14. The switch of claim 10, wherein the first output and the second output are both digital outputs.

15. A switch; comprising:
    a magnet having a north pole and a south pole and producing a magnetic field; and
    a dual output Hall Effect sensor having a north pole magnetic field sensitive area with a first digital output and a south pole magnetic field sensitive area with a second digital output, wherein the sensor is relatively positioned such that when the magnet is in the central position, both the north pole magnetic field sensitive area and the south pole magnetic field sensitive area measure zero net magnetic field and both the first digital output and the second digital output are off, when the magnet is in the first position the north pole magnetic field sensitive area measures a net magnetic field and is activated resulting in the first digital output being on, and when the magnet is in the second position the south pole magnetic field sensitive area measures a net magnetic field and is activated resulting in the second digital output being on.

16. The switch of claim 15, further comprising a magnet holder configured to house the magnet and define a pathway of movement for the magnet from the central position to either the first position or the second position.

17. The switch of claim 16, wherein the pathway of movement for the magnet is a rotational pathway.

* * * * *